(12) United States Patent
Grubb et al.

(10) Patent No.: US 6,677,032 B1
(45) Date of Patent: Jan. 13, 2004

(54) CORROSION-AND CHIP-RESISTANT COATINGS FOR HIGH TENSILE STEEL

(75) Inventors: Tina L. Grubb, Sinking Spring, PA (US); Catherine A. Kleckner, Bethel, PA (US); William E. Wertz, Reading, PA (US); Michael C. Siminski, Sinking Spring, PA (US); Andrew T. Daly, Sinking Spring, PA (US); Jeno Muthiah, Wernersville, PA (US)

(73) Assignee: Rohm and Haas Company, Philadelphia, PA (US)

(*) Notice: Subject to any disclaimer, the term of this patent is extended or adjusted under 35 U.S.C. 154(b) by 0 days.

(21) Appl. No.: 09/703,408

(22) Filed: Nov. 1, 2000

Related U.S. Application Data

(62) Division of application No. 09/173,146, filed on Oct. 15, 1998, now abandoned.

(51) Int. Cl.$^7$ .................. B32B 15/08; B32B 27/06; B32B 27/18; B32B 27/38; B32B 31/26
(52) U.S. Cl. .............. 428/215; 428/220; 428/318.6; 428/319.3; 428/328; 428/332; 428/416; 428/418; 427/195; 427/202; 427/203; 427/375; 427/386; 427/388.2
(58) Field of Search .............. 525/65, 107, 119; 428/413, 416, 418, 215, 332, 220, 318.6, 319.3, 297.4, 300.7, 301.4, 328; 427/195, 202, 203, 375, 386, 388.2

(56) References Cited

U.S. PATENT DOCUMENTS

| | | | | |
|---|---|---|---|---|
| 3,947,522 A | * | 3/1976 | Shelley, Jr. et al. | 525/113 |
| 4,381,334 A | * | 4/1983 | Balk et al. | 428/332 |
| 4,572,868 A | * | 2/1986 | Hosaka et al. | 428/328 |
| 5,091,242 A | * | 2/1992 | Chung | 428/301.1 |
| 5,196,261 A | * | 3/1993 | Ono et al. | 428/310.5 |
| 5,686,185 A | * | 11/1997 | Correll et al. | 428/418 |
| 5,789,482 A | * | 8/1998 | Eldin et al. | 525/65 |
| 5,981,086 A | * | 11/1999 | Siminski | 428/624 |

FOREIGN PATENT DOCUMENTS

JP 59-29154 * 8/1982

OTHER PUBLICATIONS

Encyclopedia of Polymer Science and Engineering, vol. 6, Epoxy Resins: Fillers, pp. 362–363, Jun. 1987.*

English language translation of Japanese Patent 59–29154, Aug. 1982.*

English translation of JP 58–114766, Jul. 1983.*

Derwent Acc. No. 1983–737866, abstract of JP58–114766, Jul. 1983.*

Alger, Polymer Science DIctionary, $2^{nd}$ Edition, pp. 5–6, Apr. 1999.*

* cited by examiner

*Primary Examiner*—Ramsey Zacharia
(74) *Attorney, Agent, or Firm*—Andrew E. C. Merriam

(57) ABSTRACT

Corrosion- and chip-resistant coatings for high tensile steel components, such as automotive coil springs, are formed from a coating powder composition of "toughened" epoxy resin. In a single coat embodiment, the entire coating is loaded with at least 75 phr zinc powder. In a dual coat embodiment, an inner coat is loaded with at least 75 phr zinc and an outer, zinc-free coating is reinforced by the addition of fibers and/or by a foaming agent which renders it porous.

20 Claims, No Drawings

CORROSION-AND CHIP-RESISTANT COATINGS FOR HIGH TENSILE STEEL

This application is a divisional of U.S. patent application Ser. No. 09/173,146, filed on Oct. 15, 1998, now abandoned.

The present invention is directed to coatings for high tensile steel objects, such as springs formed from high tensile steel which provide corrosion and chip-resistance to the high tensile steel.

BACKGROUND OF THE INVENTION

Steel coil springs in the wheel assemblies of automobiles and other vehicles are subjected to very corrosive conditions. Conventional steel springs were expected to rust, and to allow for such rusting, conventional coil springs were formed of appropriately thick steel.

To improve the steering and ride control of automobiles, it is desirable to move the wheels outward, toward the corners of the vehicle. This increases torsional stress on the automobile body structure which must be nullified using a stronger frame assembly or weight reduction of the suspension components moved toward the corners. Reduced diameter, high tensile steel, coil springs weigh less than conventional automotive suspension coil springs, so they offer means to reduce the weight of these components. Super high tensile steel offers the promise of further weight reduction.

Herein, high tensile steel is defined as having MPa) (megapascal (N/m$^2$) ranging from 1800 Mpa to 2100 Mpa; this includes super high tensile steel from 1950 Mpa to 2100 Mpa or above.

High tensile steel,.coil springs are scratch and notch sensitive, so they require protection from impact damage caused by flying stones and gravel encountered during driving on paved or unpaved roads. Also, to maintain desired metallurgical properties and prevent premature flex damage failure, the high tensile steel cannot be heated beyond 325° F. (163° C.).

Conventional "E" coat primers and/or epoxy powder coatings used on strut type automotive suspension springs are unacceptable at inhibiting flying stone damage as determined by low temperature gravelometer testing followed by accelerated scab corrosion testing of high tensile springs. Neither layer applied alone will provide the chip and corrosion protection required.

A current approach to providing corrosion and chip resistance to high tensile steel is described in U.S. Pat. No. 5,981,086, filed Oct. 8, 1996, the teachings of which are incorporated herein by reference. This patent application describes a dual layer coating including a zinc rich, thermoset, epoxy base coat which provides corrosion resistance and a thermoplastic outer coating which provides chip-resistance. The particular thermoplastic resin taught in U.S. Pat. No. 5,981,086 is an ethylene/acrylic acid copolymer, a relatively expensive material. Polyolefins can be substituted for ethylene/acrylic acid copolymer, and although polyolefins are less expensive materials, thicker layers are required to provide the requisite chip-resistance. Also, processing of thermoplastics is expensive. A general disadvantage of such a dual layer coating is that two separate coating operations are required and two separate heating cycles are required, the first to fuse and cure, at least in part, the epoxy resin of the base coat and a second to fuse the thermoplastic resin of the outer coat plus complete curing of the epoxy base coat. Both the material of the base coat and the outer coat must be cycled at a temperature below that thereat the steel would lose its high tensile strength; accordingly the choice of suitable resins systems for the two layers is limited.

It is accordingly an object of the present invention to provide coatings for high tensile steel which are less expensive than the coatings currently in use and which can be processed with a single heat cycle.

SUMMARY OF THE INVENTION

In accordance with the invention, chip- and corrosion-resistant coatings for high tensile steel are provided in which the resin component is entirely a "toughened" epoxy resin. Corrosion-resistance is provided by high zinc loading, particularly in the portion of the coating in contact with the high tensile steel.

As one method of toughening the epoxy resin, the epoxy is adducted to (chemically bound to) between about 5 and about 25 wt % (based on total weight of the epoxy component and the elastomer component) of an elastomer having a glass transition temperature ($T_g$) of –30° C. or below, preferably a $T_g$ of –40° C. or below. A particularly suitable elastomeric component is carboxyl-terminated butadiene/acrylonitrile (CTBN) rubber. The elastomeric component flexibilizes the resin and remains flexible down to temperatures to which the component part may be subjected to in cold weather conditions.

In accordance with another method of toughening the epoxy resin, the epoxy resin is chemically bound as an outer shell to a soft rubber core having a $T_g$ of about –30° C. or below, preferably about –40° C. or below, for example an acrylic rubber core having carboxylic acid functionality by which the epoxy resin of the shell is bound. Such acrylic rubbers might be formed from (meth)acrylic acid and (meth) acrylic esters In the fused and cured coating provided by such a powder, the acrylic rubber cores are believed to act to terminate any fracturing of the coating which may begin due to impact. In the core/shell resins which are used to form the coating powder, the acrylic rubber comprises between about 5 and about 20wt % of the resin based on total of epoxy shell and acrylic rubber core, and the epoxy of the shell the remaining about 80 to about 95 wt %.

In accordance with another method of toughening the epoxy resin, the epoxy resin is cured with a multi-hydroxy functional curing agent having a hydroxyl equivalent weight of at least 200, preferably at least about 300, up to about 500. The distance between hydroxyl groups of such a curing agent provides flexibility to the cured epoxy resin. This toughening method may be used alone or in conjunction with either of the two above-discussed toughening methods.

Although, each of the above-described hardened epoxies exhibit chip-resistance, such chip resistance is insufficient to meet the requirements for high tensile steel springs. However, as noted above, the hardened epoxies are zinc-loaded, i.e., with at least 75 parts per hundred resin (based on total of epoxy resin, hardening resin if present, and epoxy cross-linker), preferably at least about 150 phr zinc, and more preferably at least about 200 phr zinc. Surprisingly, and unexpectedly, the zinc, added for corrosion resistance, further toughens the epoxy that: is toughened by any of the three above-discussed methods. Accordingly, a toughened, zinc-loaded epoxy, at a fused and cured thickness of between about 12 and about 20 mils, preferably at least about 15 mils, may be applied as a single coat to high tensile steel, including high tensile steel springs, and meet present day commercial requirements for chip and corrosion-resistance.

A single coat of toughened, zinc-loaded epoxy has the advantage of simplicity, being applicable in a single powder coating operation and then processed through a single heating cycle to heat and cure the epoxy resin.

On the other hand, a single coat of toughened, zinc-loaded epoxy is wasteful of zinc in that only the zinc in close proximity to the high tensile steel affords corrosion protection. As zinc is a relatively expensive material, there is provided in accordance with the invention a dual coat embodiment in which an inner coat between about 1.5 and about 3 mils thick is one of the toughened, zinc-loaded epoxies described above with respect to the single coat embodiment, and an outer coat, between about 10 and about 15 mils thick, is of the same toughened epoxy as the inner coat, but without the zinc.

As noted above, any of the above-described toughened epoxies provide chip resistance, but, insufficient chip resistance to meet current requirements for high tensile steel springs. Accordingly, the zinc-free outer coat is further toughened. One method of further toughening the outer layer is to add fibers to the outer coat formed of a material, such as glass, aramid or carbon, which does not melt or degrade at the processing temperatures to which the coating powder is subjected. Useful fibers have diameters between about 5 and about 20 μm, and are used at between about 20 and about 80 phr of the resin used to form the outer coat. Another method of further toughening the outer coat is to add a blowing agent to the outer coat resin such that when processed, the density of the outer coat is reduced by at least about 25 %, preferably at least 40% relative to theoretical density. Above about 65 % reduction in density, the coating becomes weakened. The foaming provides porosity to the outer coating. A porous outer coat, when struck by material such as gravel may be dented, but will not fracture. Most preferably, the resin of the outer coat is further toughened by both the addition of fibers as well as by foaming through use of a blowing agent.

The dual coating is by a "dry on dry" method and processed in a single heating cycle. First, the toughened, zinc-loaded, epoxy coating powder is applied, e.g., electrostatically, to the high tensile steel, e.g., a spring, in an amount sufficient to form the inner coat of desired thickness. Then the coating powder for the outer coat is applied in an amount sufficient to form the outer coat of desired thickness. Then the powder coated, high tensile steel object is heated to fuse and cure the coating powders, thereby producing the dual coating. Because the same toughened epoxy resin is used to form both the inner and outer coats, the heating cycle produces a dual layer structure in which the two layers are integrally bonded to each other through the cross-linking of the epoxy resins of the inner and outer layer.

Detailed Description of Certain Preferred Embodiments

Herein, unless otherwise noted, all percentages are by weight. In the coating powders described herein, the epoxy resin and any toughening resin which becomes an integral part of the cross-linked structure are considered to be the resin system. Amounts of other materials, such as powdered zinc, glass, aramid or carbon fibers, blowing agents, etc. are expressed as parts per hundred by weight relative to the resin system calculated as 100 parts.

Herein, standards set by General Motors are considered to be a reliable, present day standard for chip and corrosion resistance, particularly General Motor's "Chip Resistance of Coating" test (GM published test no. GM9508P) followed by GM's "Scab Corrosion Creepback Test" (GM published test no. GM9511P).

The coating powder of Zn-loaded epoxy resin may be coated directly onto a high-tensile steel component. Preferably, however, the high-tensile steel is coated first with zinc phosphate.

The epoxy resin may be chosen from a variety of epoxy resins useful for coating powders known in the art, such as those produced by the reaction of epichlorohydrin or polyglycidyl ether and an aromatic polyol such as bisphenol, e.g., bisphenol A. The epoxy resin should have an epoxy functionality greater than 1.0 and more preferably greater than 1.9. Generally the epoxy equivalent weight should be at least about 170, but lower values may be possible in some cases; for example it may be 100 or more. Preferably the epoxy equivalent weight is less than 2300, especially less than 1000, for example from 130 to 1500, especially 150 to 800. Such epoxy resins may be produced, for example, by an etherification reaction between an aromatic or aliphatic polyol and epichlorohydrin or dichlorohydrin in the presence of an alkali such as caustic soda. The aromatic polyol may be for example, bis(4-hydroxyphenyl)-2,2-propane (i.e. bisphenol A), bis(4-hydroxyphenyl)-1,1-ethane, bis(4-hydroxyphenol), 1, 1-isobutane, bis(4-hydroxy-t-butylphenyl)-2,2-propane, bis(2-hydroxynaphthyl)methane, or 4.4'-dihvdroxybenzophenone. The aliihatic polvol may be, for example. 1,5-pentanediol, 1,6-hexanediol, diethylene glycol, triethylene glycol, polyethylene glycol, polypropylene glycol or dipropylene glycol; diglycidyl ethers or condensed glycidyl ethers of such diols can be used. Other oxirane group-containing polymers that can be used as the epoxy resin in hybrid powder coating compositions according to this invention include polyglycidyl-functional acrylic polymers or epoxy novolac resins. Preferred epoxy resins for use in the present invention are those based on bisphenol A.

In accordance with the first epoxy-toughening method described above, the epoxy resin, preferably a bisphenol A resin, is adducted to an elastomer having a $T_g$ of −30° C. or below, preferably −40° C. or below. The preferred elastomer is CTBN rubber. Such epoxy/CTBN rubber adducts are described, for example, in U.K. Patent Specification 1,407, 851 (C. G. Taylor) published Sep. 24, 1975 and *Powder Coatings*. 184 "Elastomer-Modified Epoxy Powder Coatings: a Review", Apr. 13, 1994, No. 4347. To provide the necessary flexibilizing for cold-temperature chip resistance, the CTBN component should be present at at least about 5 wt % of the total of the CTBN and the epoxy components. Above about 25 wt % CTBN, no further benefit is realized and it is not desired to exceed 25 wt % lest there be insufficient epoxy component for a good cure. The fact that the elastomer component is chemically bound to the epoxy component, i.e., by esterification reaction of the carboxyl groups of the CTBN with epoxy groups, ensures that a complete phase separation does not occur during fusion and curing of the coating powder. However, there are microdomains of epoxy and rubber.

In the second toughening method above, a core/shell resin is used in which an acrylic rubber resin forms the core and the epoxy resin, preferably a bisphenol A epoxy resin, forms the shell. Again, chemical bonding between carboxylic functionality of the acrylic rubber resin of the core and the epoxy resin of the shell prevents phase separation during fusion and curing of the coating powder formed using the core/shell resin. Such acrylic rubber modified epoxies are describe, for example, by Dow Chemical Company in *Polymer Reprints*, 32(3) pp. 358–9 by H -J Sue and E. I. Garcia-Melfin.

Thermosetting epoxy resins contain either a cross-linking agent, such as a polyhydroxyl compound or a cure catalyst to effect auto-cross-linking of the epoxy resin.

As a third toughening method, the epoxy resin is cured with a polyhydroxyl functionality having a relatively high hydroxy equivalent weight, i.e., at least about 200 up to about 500, preferably at least about 300. The relatively high hydroxy equivalent weight of the cross-linking agent ensures relatively long chain length between OH groups, which chain lengths provide flexibility to the cured coating, helping to render the coatings chip-resistant. Suitable curing agents useful in the practice of this invention are exemplified by, but are not limited to, phenolic curing agents, such as a bisphenol A end capped diglycidyl ether of bisphenol A, which is the reaction product of a diglycidyl ether of bisphenol A and bisphenol A. Examples of preferred phenolic curing agents for the epoxy resin component includes those sold under the trademarks D. E. H.™ 87 and D. E. H.™ 85 by Dow Chemical Company, both of which are believed to be bisphenol A end capped diglycidyl ethers of bisphenol A. Other classes of phenolic hardeners can used as well such as phenol- and cresol-novolac curing agents sold by Georgia Pacific, Reichhold Chemicals and Ciba Geigy.

Zinc powder is added to provide corrosion resistance, but, as noted above, the Zn also acts as a toughening agent in conjunction with any of the toughened epoxies described above. Accordingly, a single coat of such Zn-rich, toughened epoxy coating can be used to form a single-coat on a high tensile steel component and provide such component with both chip-resistance and corrosion resistance. Zinc powder useful in the invention typically has an average particle size of about 4.0 microns.

Again, cost efficiencies are achieved by applying an inner coat, between about 1.5 and about 3 mils thick, of zinc-laden, toughened epoxy in contact with the high tensile steel and applying an outer coating of toughened epoxy which is free of zinc, but which either contains reinforcing fibers and/or is foamed through use of a foaming agent. Preferably, a zinc-free outer coating both contains fiber and is foamed. If a dual coat coating is formed, it is preferred that the resin composition of the two coats be substantially identical, whereby a generally continuous thermoset resin structure forms with the inner coat being rich in zinc and the outer coat being reinforced by fiber and/or foaming.

If a foaming agent is used, it may be either admixed in dry form with the coating powder, whereupon it tends to coat the surfaces of the coating powder particles, or (preferably) is integrally incorporated in the coating powder itself. If integrally mixed, the foaming agent must be activated at a temperature above that at which the coating powder composition is fused into a coating powder, but at or below the temperature at which the coating powder is fused and cured to coat the high tensile steel. Typically, foaming agent is used at between about 0.1 and about 5 phr, preferably at least about 0.5 phr, the actual amount depending upon the particular:foaming agent, the particular resin system, the processing conditions and the degree to which density reduction is desired. Depending upon the amount of ingredients in addition to the resin, the foaming agent is used at between about 0.1 and about 3 wt % of the entire formulation, preferably at least about 0.3 wt %.

The foaming coating powders used in the present invention may be used by themselves to coat substrates. Generally foaming in coating powders has been considered desirable. Thus it has been a general object of coating powders to avoid out-gassing, e.g., out-gassing of water, which produce pinholes and detract from the appearance of the coating. However, in accordance with one aspect of the present invention, functional advantages are found for coating powders which produce a foamed coating. While a foamed coating is described above as a top coat in respect for a dual-coating for high tensile steel, a foamed coating may be used by itself for impact resistance where the requirements are less stringent.

Foamed coatings also provide both thermal and acoustical insulation. Thus, for example, a foamed coating might be used to coat an automotive oil pan or on the interior of automotive door panels to damp vibration.

Foamed coatings used in the present invention are not resilient, are homogeneously porous and but rather indent or crush when impacted. One application for such a crushable foamed coating is in the area of providing the appearance of very minimal tolerance between component parts where manufacturing requirements allow for a greater tolerance. For example, foamed coatings on the door and door jam of a hotel safe will crush to form the appearance of an extremely tight fit even if the actual tolerance is greater.

A blowing or foaming agent to be incorporated in a coating powder must be selected so as not to foam during the heat fusion of the materials to form the coating powder, typically at a temperature of between about 180° C. and about 240° C. for epoxy coating powders, but produce significant gas for foaming at the fusion/curing temperature of the coating powder, typically about 300° C. or above for epoxy coating powders. A currently preferred heat-activated foaming agent for epoxy coatings is p-toluene sulfonyl hydrazide, such as that sold as Celogen® TSH sold by Uniroyal Chemical Company. Other suitable blowing agents include, but are not limited to 2,2'-azobisisobutyro nitrile, dinitrosopentamethylenetetramine, sodium bicarbonate, ammonium carbonate, silicon oxyhydride and azocarbonamide.

Chemical foaming agents such as sodium borohydride might also be used to produce foaming. To foam, sodium borohydride requires a proton donor, such as water. U.S. Pat. No. 4,491,554, the teachings of which are incorporated herein by reference, describes the use in plastics of salt hydrates in conjunction with alkali metal borohydrides to produce foaming at elevated temperature, the salt hydrate only releasing water above a certain threshold temperature. For epoxy-based coating powders, the combination of sodium borohydride and alumina trihydrate is a useful combination of foaming agent and proton donor. As described in U.S. Patent No. 4,491,554, alumina trihydrate releases no water below 260° C. but releases significant amounts of water at temperatures above 300° C. Thus, the coating powder can be compounded at temperatures below 260° C. and fused/cured at temperatures above 300° C. so as to produce a foamed coating.

The concept of foamed coating powders is not limited to epoxy-based coating powders, but applies to all types of coating powders, including, but not limited to acrylic coating powders, polyester coating powders, silicone-based coating powders, etc. The choice of foaming agents for such coating powders will be selected according to the differences in temperatures at which such coating powders are compounded and a the temperatures at which such coating powders are fused and cured.

An alternative way of producing a foamed coating in which two chemical components are required to produce gas is to prepare a dry blend of two coating powders, one of which contains one of the chemical components and the other of which contains the other chemical component. For example, an epoxy coating powder containing sodium borohydride might be dry-blended with an acrylic coating powder containing carboxylic acid functional acrylic polymers.

When fused and cured, the carboxylic acid functionality of the acrylic coating powder will contribute the protons for foaming the sodium borohydride.

The :coatings powders useful in the invention may also incorporate minor components known in the art, e.g., pigments, flow control agents, etc.

Coating powders used to provide the chip-resistant and corrosion-resistant coatings of the present invention are produced in the usual manner. The components are blended, and then are melt-compounded with heating above the melting point of the resin for a short time, e.g., 30–90 sec., so that no significant curing occurs. The molten compound is extruded, and after extrusion, the composition is rapidly cooled. The composition is then ground and, as necessary, the particulates sorted according to size. For electrostatic coating, the particles are generally in the 5–100 micron size range with a major portion generally being in the 20–40 micron size range. Larger particulates are useful for fluidized bed coating operations.

The invention will now be described in greater detail by way of specific examples.

EXAMPLE 1

A Coating Powder is Formed From the Following Ingredients:

| Components | PHR |
| --- | --- |
| [1]Araldite ® GT 7074 | 92 |
| [2]Araldite ® GT 7226 | 8 |
| [3]D.E.H. TM 87 | 20.8 |
| [4]Epon TM P-101 | 3 |
| [5]Zinc Dust 64 | 250 |
| [6]Raven 1255 | 3 |

Hand Blend, Extrude Into Sheets, air Cool, Break Into Chips, Then add

| [7]Cab-O-Sil M5 | 1.1 |
| --- | --- |

Grind at high speed to powder and screen at 100 mesh.
[1] Araldite® GT 7074 is a diglycidyl ether of bisphenol A epoxy resin with a weight per epoxide between 935 and 1175 that is commercially available from Ciba-Geigy Corporation.
[2]Araldite® 7226 is a master batch epoxy resin containing 90 wt % of a diglycidyl ether of bisphenol A epoxy resin with a weight per epoxide between 795 and 895 and 10 wt % of Acronal® 4F acrylic flow modifier. Master batch is commercially available from Ciba-Geigy Corporation.
[3]D. E. H. TM 87 is a bisphenol A end capped diglycidyl ether of bisphenol A that has an hydroxyl equivalent weight between 370 and 400 and is commercially available from Dow Chemical Company.
[4]Epon Curing Agent® P-101 is an imidazole adduct with a diglycidyl ether of bisphenol A epoxy resin that is commercially available from Shell Chemical Company.
[5]Zinc Dust 64 is a zinc powder that is commercially available through E.W. Kauftnann Corporation.
[6] Raven 1255 is a carbon black pigment that is commercially available from Columbian Chemical.
[7]Cab-O-Sil® M5 is a fumed silica that is commercially available from Cabot Corporation.

The epoxy powder coating composition in example 1 was then electrostatically sprayed onto high tensile steel springs at various thicknesses.

EXAMPLE 2

A Coating Powder is Formed From the Following Ingredients:

| Components | PHR |
| --- | --- |
| [1]RSS-1704 | 100 |
| [2]Casamine OTB | 3.7 |
| [3]MB 2MI | 0.15 |
| [4]Resiflow ® P-67 | 1.4 |
| Zinc Dust 64 | 250 |
| Raven 1255 | 4 |

Hand Blend, Extrude Into Sheets, air Cool, Break Into Chips, Then add

Cab-O-Sil M5 1.1

Grind at high speed to powder and screen at 100 mesh.
[1]RSS-1704is an experimental CTBN (carboxy terminated butadiene/acrylonitrile) modified diglycidyl ether of bisphenol A epoxy resin with a weight per epoxide between 850 and 1050 that is available from Shell Chemical Company.
[2]Casamine OTB is an ortho tolyl biguanide curing agent and is commercially available from Thomas Swan & Company.
[3]MB 2 MI is a master batch containing 95 wt % of Dyhard MI, 2-methyl imidazole, and 5 wt % Cab-O-Sil M5 and is commercially available from SKW Chemicals, Inc.
[4]Resiflow ° P-67 is an acrylic flow aid that is a polyacrylate and is commercially available from Estron Chemical Company.

The epoxy powder coating composition in example 2 was then electrostatically sprayed onto high tensile steel springs at various thicknesses.

EXAMPLE 3

A Coating Powder is Formed From the Following Ingredients:

| Components | PHR |
| --- | --- |
| [1]Toughener | 100 |
| Casamine OTB | 4.84 |
| MB 2MI | 0.20 |
| Resiflow ® P-67 | 1.4 |
| Zinc Dust 64 | 250 |
| Raven 1255 | 4 |

Hand Blend, Extrude Into Sheets, air Cool, Break Into Chips, Then add

| [2]Aluminum Oxide C | 0.7 |
| --- | --- |

Grind at high speed to powder and screen at 100 mesh.
[1] The toughener is a core/shell resin in which the core is an acid functional, low $T_g$ acrylic rubber and the shell an epoxy resin.
[2]Aluminum Oxide C is a fumed alumina that is commercially available from Sullivan Associates, Inc.

"The epoxy powder coating composition in example 3 was then electrostatically sprayed onto high tensile steel springs at various thicknesses."

EXAMPLE 4 (Comparative)

A coating powder is formed from the following ingredients:

| Components | PHR |
|---|---|
| Araldite ® GT 7074 | 92 |
| Araldite ® GT 7226 | 8 |
| D.E.H. TM 87 | 20.8 |
| Epon TM P-101 | 3 |
| [1]Texaquart 900 | 1 |
| Raven 1255 | 3 |
| Cab-O-Sil M5 | 2.5 |
| Hand blend, extrude into sheets, air cool, break into chips, then add | |
| Cab-O-Sil M5 | 38 |
| Grind at high speed to powder and screen at 100 mesh. | |

[1]Texaquart 900 is a complex fatty acid that is commercially available through E. W. Kaufmann Corporation.

The epoxy powder coating composition in example 4 was then electrostatically sprayed onto high tensile steel springs at various thickness.

EXAMPLE 5

A coating powder is formed from the following ingredients:

| Components | PHR |
|---|---|
| [1]KR-102 | 100 |
| Casamine OTB | 2.92 |
| MB 2MI | 0.12 |
| Resiflow ® P-67 | 1.4 |
| Zinc Dust 64 | 250 |
| Raven 1255 | 4 |

Hand Blend, Extrude Into Sheets, air Cool, Break Into Chips, Then add

| | |
|---|---|
| Aluminum Oxide C | 0.7 |

Grind at high speed to powder and screen at 100 mesh.

[1] KR-102 is a CTBN (carboxy terminated butadiene/acrylonitrile) modified diglycidyl ether of bisphenol A epoxy resin with a weight per epoxide between 1,100 and 1,300 that is commercially available from Kukdo Chemical Comopany and distributed by GCA Chemical Company.

The epoxy powder coating in example 5 was then electrostatically sprayed onto high tensile steel springs at various thicknesses.

EXAMPLE 6 (comparative)

A coating powder is formed from the following ingredients:

| Components | PHR |
|---|---|
| KR-102 | 100 |
| Casamine OTB | 2.92 |
| MB 2MI | 0.12 |
| Resiflow ® P-67 | 1.4 |
| Raven 1255 | 4 |

Hand Blend, Extrude Into Sheets, air Cool, Break Into Chips, Then add

| | |
|---|---|
| Aluminum Oxide C | 0.7 |

Grind at high speed to powder and screen at 100 mesh.

The epoxy powder coating in example 6 was then electrostatically sprayed onto high tensile steel springs at various thicknesses.

EXAMPLE 7 (comparative)

A Coating Powder is Formed From the Following Ingredients:

| Components | PHR |
|---|---|
| KR-102 | 100 |
| Casamine OTB | 2.92 |
| MB 2MI | 0.12 |
| Resiflow ® P-67 | 1.4 |
| [1]Suzorite 325-HK mica | 50 |
| Raven 1255 | 4 |

Hand blend, extrude into sheets, air cool, break into chips, then add

| | |
|---|---|
| Aluminum Oxide C | 0.7 |

Grind at high speed to powder and screen at 100 mesh.

[1] Suzorite 325-HK Mica is philogopite mica powder that is commercially available through Suzorite Mica Products.

The epoxy powder coating in example 7 was then electrostatically sprayed onto high tensile steel springs at various thicknesses.

EXAMPLE 8 (Corvel® 13–7004) (comparative)

A coating powder is formed from the following ingredients:

| Components | PHR |
|---|---|
| [1]D.E.R. TM 664U | 84 |
| [2]Araldite ® 9496 | 16 |
| [3]Casamine OTB | 5 |
| [4]MB 2MI | 0.2 |
| Zinc Dust 64 | 250 |
| [5]Tioxide TR93 | 40 |
| [6]BK-5099 | 0.26 |
| Texaquart 900 | 3.0 |

Hand Blend, Extrude Into Sheets, air Cool, Break Into Chips, Then add

| | |
|---|---|
| [7]Aluminum Oxide C | 0.79 |

Grind at high speed to powder and screen at 100 mesh.

TABLE 1

| Test | Results |
|---|---|
| | (Example 1) |
| Chip resistance (per GM 9508P-Method B) | pass @ (15 mils fail @ <15 mils |
| Scab corrosion (per GM 9511P) | pass with no peelback |
| Environmental corrosion cycle J (per GM9505P) | pass |
| | (Example 2) |
| Chip resistance (per GM 9508P-Method B) | pass @ ( 11 mils fail @ <11 mils |
| Scab corrosion (per GM 9511P) | pass with no peelback |
| | (Example 4) |
| Chip resistance (per GM 9508P-Method B) | fail @ 15–21 mils |

This Shows That Without Zinc, the Coating Fails.

| Test | Results |
|---|---|
| | (Example 5) |
| Chip resistance (per GM 9508P-Method B) | pass @ (16 mils fail @ <15 mils |
| Scab corrosion (per GM 9511P) | pass with no peelback |
| | (Example 6) |
| Chip resistance (per GM 9508P-Method B) | fail @ 16–18 mils fail @ 21–24 mils |
| | (Example 7) |
| Chip resistance (per GM 9508P-Method B) | fail @ 15–18 mils fail @ 20–23 mils |

This Shows That a CTBN Modified Epoxy, With a Hard Mica Filler, but no Zinc, Fails.

| Test | Results (Corvel ® 13-7004) (Example 8) |
|---|---|
| Chip resistance (per GM 9508P-Method B) | fail @ 2–5 mils fail @ 10–15 mils fail @ 20–23 mils |
| Scab corrosion (per GM 9511P) | pass with no peelback |

This Shows That a Zinc Loaded Single Coat Without Toughenening Fails.

EXAMPLE 9

Base Coat 9
A Coating Powder is Formed From the Following Ingredients:

| Components | PHR |
|---|---|
| ¹Araldite ® GT 7074 | 92 |
| ²Araldite ® GT 7226 | 8 |
| ³D.E.H. ™ 87 | 20.8 |
| ⁴Epon P-101 | 3 |
| ⁵Zinc Dust 64 | 250 |
| ⁶Raven 1255 | 3 |

Hand Blend, Extrude Into Sheets, air Cool, Break Into Chips, Then add

| ⁷Cab-O-Sil M5 | 1.1 |
|---|---|

Grind at high speed to powder and screen at 100 mesh.

Top Coat 9
A Coating Powder is Formed From the Following Ingredients:

| Components | PHR |
|---|---|
| Araldite ® GT 7074 | 92 |
| Araldite ® GT 7226 | 8 |
| D.E.H. ™ 87 | 20.8 |
| Epon ™ P-101 | 3 |
| ⁸737 BC | 50 |
| Raven 1255 | 2 |
| Cab-O-Sil M5 | 2.5 |
| ⁹Texaquart 900 | 3.0 |

Hand Blend, Extrude Into Sheets, air Cool, Break Into Chips, Then add

| Cab-O-Sil M5 | 0.36 |
|---|---|

Grind at high speed to powder and screen at 100 mesh.

[1] Araldite® GT 7074 is a diglycidyl ether of bisphenol A epoxy resin with a weight per epoxide between 935 and 1175 that is commercially available from Ciba-Geigy Corporation.

[2] Araldite® GT 7226 is a master batch epoxy resin containing 90 wt % of a diglycidyl ether of bisphenol A epoxy resin with a weight per epoxide between 795 and 895 and 10 wt % of Acronal® 4F acrylic flow modifier. Master batch is commercially available from Ciba-Geigy Corporation.

[3] D. E. H.™ 87 is a bisphenol A end capped diglycidyl ether of bisphenol A that has an hydroxyl equivalent weight between 370 and 400 and is commercially available from Dow Chemical Company.

[4] Epon Curing Agent® P-101 is an imidazole adduct with a diglycidyl ether of bisphenol A epoxy resin that is commercially available from Shell Chemical Company.

[5] Zinc Dust 64 is a zinc powder that is commercially available through E.W. Kaufmann Corporation.

[6] Raven 1255 is a carbon black pigment that is commercially available from Columbian Chemical.

Cab-O-Sil® M5 is a fumed silica that is commercially available from Cabot Corporation.

[8] 737 BC is milled e-glass fibers that are commercially available from Owens Corning.

9Texaquart 900 is a complex fatty ester for antistatic enhancement and is commercially available from E. W. Kaufmann Corporation.

The base powder coating composition in example 9 was then electrostatically spayed onto high tensile steel, followed by application of the top coat at various thickness.

EXAMPLE 10

Base Coat 9 (as in Example 9)

Top Coat 10

A Coating Powder is Formed From the Following Ingredients:

| Components | PHR |
| --- | --- |
| Araldite ® GT 7074 | 92 |
| Araldite ® GT 7226 | 8 |
| D.E.H. ™ 87 | 20.8 |
| Epon ™ P-101 | 3 |
| 737 BC | 50 |
| Raven 255 | 2 |
| Cab-O-Sil M5 | 2.5 |
| Texaquart 900 | 3.0 |

Hand Blend, Extrude Into Sheets, air Cool, Break Into Chips, Then add

| Cab-O-Sil M5 | 0.36 |
| --- | --- |

Grind at high speed to powder and screen at 100 mesh, then add

| [1]Celogen TSH | 1.8 |
| --- | --- |

[1]Celogen TSH is a heat actuated foaming agent, p-toluene sulfonyl hydrazide, that is commercially available from Uniroyal Chemical Company.

Henschel blend at high speed and screen at 100 mesh.

The base powder coating composition in example 10 was then electrostatically spayed onto high tensile steel, followed by application of the top coat at various thickness.

EXAMPLE 11

Base Coat 9 (as in Example 9)

Top Coat 11

A Coating Powder is Formed From the Following Ingredients:

| Components | PHR |
| --- | --- |
| Araldite ® GT 7074 | 92 |
| Araldite ® GT 7226 | 8 |
| D.E.H. ™ 87 | 20.8 |
| Epon ™ P-101 | 3 |
| Raven 1255 | 2 |
| Cab-O-Sil M5 | 2.5 |
| Texaquart 900 | 3.0 |

Hand Blend, Extrude Into Sheets, air Cool, Break Into Chips, Then add

| Cab-O-Sil M5 | 0.36 |
| --- | --- |

Grind at high speed to powder and screen at 100 mesh, then add

| Celogen TSH | 1.3 |
| --- | --- |

Henschel blend at high speed and screen at 100 mesh. The base powder coating composition in example 11 was then electrostatically spayed onto high tensile steel, followed by application of the top coat at various thickness.

| Test | Results |
| --- | --- |
| | (Example 9) |
| Chip resistance (per GM 9508P-Method B) | pass @ >16 total mils fail @ <15 total mils |
| Scab corrosion (per GM 9511 P) | pass with no peelback |
| | (Example 10) |
| Chip resistance (per GM 9508P-Method B) | pass @> 15 total mils fail @ <15 total mils |
| Scab corrosion (per GM 9511 P) | pass with no peelback 10 |
| Environmental corrosion cycle J (per GM9505P) | pass |
| | (Example 11) |
| Chip resistance (per GM 9508P-Method B) | pass @ >17 total mils fail @ <17 total mils |
| Scab corrosion (per GM 9511 P) | pass with no peelback |
| Environmental corrosion cycle J (per GM9505P) | pass |

What is claimed is:

1. A coating for a high-tensile steel surface comprising: a coating in continuous contact with and bonded to said surface wherein said coating comprises: a fused and cured product of a coating powder composition, said composition comprising:
    1) a resin, comprising:
        a) 5% to 20% by total weight of said resin of a core of an acrylic rubber having a glass transition temperature of −30° C. or below; and
        b) 80% to 95% by total weight of said resin of a shell; said shell comprising an epoxy resin; wherein said core and said shell are chemically bonded to each other; and
    2) at least 75 phr (parts per hundred resin) of zinc particles.

2. A coating according to claim 1 wherein the zinc particles have a mean particle diameter of 4 microns.

3. A coating according to claim 1 wherein the coating composition comprises at least 150 phr of zinc particles.

4. A coating according to claim 1 having a fused and cured thickness in the range of 12 mils to 20 mils.

5. A coating according to claim 1 wherein the coating composition further comprises a polyhydroxyl cross-linker having a hydroxyl equivalent weight of from 200 to 500.

6. A method for coating a high-tensile steel surface to provide a chip resistant coating according to claim 1 comprising
    applying said coating composition to said surface, and
    heating said coating composition to form a fused and cured coating.

7. A dual coating for a high-tensile steel surface, comprising: a first coating in continuous contact with and bonded to said surface and a second outer coating in continuous contact with and bonded to said first coating, wherein said first coating comprises: a fused and cured product of a first coating powder composition, said composition comprising:
1) a resin, chosen from:
    a) a core shell resin comprising from 5% to 20% by total weight of said resin of a core of acrylic rubber having a glass transition temperature of −30° C. or below and 80% to 95% by total weight of said resin of a shell comprising an epoxy resin, wherein said core and said shell are chemically bonded to each other; or
    b) an adduct comprising between 75 and 95 wt % based on the total weight of said adduct, of an epoxy resin component and between 5 and 25 wt %, based on the total weight of said adduct of an elastomer component having a glass transition temperature of −30° C. or below, and
2) at least 75 phr (parts per hundred resin) of zinc particles; and,
wherein said second outer coating comprises:
    a fused and cured product of a second coating powder composition, said composition comprising: a resin chosen from:
    a) a cores hell resin comprising from 5% to 20% by total weight of said resin of a core of acrylic rubber having a glass transition temperature of −30° C. or below; and 80% to 95% by total weight of said resin of a shell, wherein said core and said shell are chemically bonded to each other; or,
    b) an adduct comprising between 75 and 95 wt %, based on the total weight of said adduct, of an epoxy resin component and between 5 and 25 wt %, based on the total weight of said adduct, of an elastomer component having a glass transition temperature of −30° C. or below; said second outer coating being zinc free.

8. A dual coating according to claim 7 wherein the said epoxy resin component of said first coating powder composition, said second coating powder composition, or both said first and said second coating powder composition is a bisphenol epoxy resin.

9. A dual coating according to claim 7 wherein the first coating powder composition comprises at least 150 phr of zinc particles by total weight of said resin.

10. A dual coating according to claim 7 wherein the first coating powder composition comprises at least 200 phr of zinc particles by total weight of said resin.

11. A dual coating according to claim 7 wherein the first coating has a fused and cured thickness in a range of 1.5 mils to 3 mils and the second outer coating has a fused and cured thickness in a range of 10 mils to 15 mils.

12. A dual coating according to claim 7 wherein the second coating powder composition further comprises fibers at 20 phr to 80 phr by total weight of said resin.

13. A dual coating according to claim 12 wherein the second coating powder composition further comprises a blowing agent resulting in a porous second outer coating having a cured density reduced by at least 25% relative to the uncured density of said composition.

14. A dual coating according to claim 7 wherein the second coating powder composition further comprises a blowing agent resulting in a porous second outer coating having a cured density reduced by at least 25% relative to the uncured density of said composition.

15. A dual coating according to claim 7 wherein the second coating powder composition further comprises a polyhydroxyl functional cross-linker having a hydroxy equivalent weight of from 200 to 500.

16. A dual coating according to claim 7 wherein the said elastomer component of said first coating powder composition, said second coating powder composition, or both said first and said second coating powder composition is a carboxyl terminated butadiene/acrylonitrile rubber.

17. A method for providing a chip resistant coating on high tensile steel according to claim 7 comprising
    applying said first coating powder composition to said surface,
    applying said second coating powder composition to said first coating composition, and
    heating to fuse and cure said first and second coating compositions to form a dual coating,
wherein said heating optionally includes heating prior to applying said second coating composition to fuse and cure said first coating composition to form said first coat of said dual coating.

18. A dual coating for a high-tensile steel surface, comprising: a first coating in continuous contact with and bonded to said surface and a second outer coating in continuous contact with and bonded to said first coating;
    wherein said first coating comprises:
        a fused and cured product of a first coating powder composition, said composition comprising:
        1) a resin, comprising:
            a) an epoxy resin;
            b) a polyhydroxyl functional cross-linker having a hydroxy equivalent between about 200 and 500; and
        2) at least 75 phr of zinc particles by total weight of said resin; and
    wherein said second outer coating comprises:
        a fused and cured product of a second coating powder composition, said composition comprising:
            a) an epoxy resin; and
            b) a polyhydroxyl functional cross-linker having a hydroxy equivalent weight of from 200 to 500; said second outer coating being zinc free, and further wherein said second coating powder composition further comprises a blowing agent resulting in a porous second outer coating having a cured density reduced by at least 25% relative to the uncured density of said composition such that the second outer coating is homogeneously porous.

19. A dual coating according to claim 18 wherein the second coating powder composition further comprises fibers at 20 phr to 80 phr by total weight of said resin.

20. A method for providing a chip resistant coating on high tensile steel according to claim 18 comprising
    applying said first coating powder composition to said surface,
    applying said second coating powder composition to said first coating composition, and
    heating to fuse and cure said first and second coating compositions to form a dual coating,
wherein said heating optionally includes heating prior to applying said second coating composition to fuse and cure said first coating composition to form said first coat of said dual coating.

* * * * *